(12) United States Patent
Cimmino

(10) Patent No.: US 10,875,593 B2
(45) Date of Patent: Dec. 29, 2020

(54) SUPPORTING FRAME FOR MOTOR-VEHICLE BODYSHELLS

(71) Applicant: FCA Italy S.p.A., Turin (IT)

(72) Inventor: Giuseppe Cimmino, Turin (IT)

(73) Assignee: FCA Italy S.p.A., Turin (IT)

( * ) Notice: Subject to any disclaimer, the term of this patent is extended or adjusted under 35 U.S.C. 154(b) by 0 days.

(21) Appl. No.: 16/458,815

(22) Filed: Jul. 1, 2019

(65) Prior Publication Data

US 2020/0010133 A1 Jan. 9, 2020

(51) Int. Cl.
*B62D 65/18* (2006.01)
*B65G 17/00* (2006.01)

(52) U.S. Cl.
CPC .......... *B62D 65/18* (2013.01); *B65G 17/002* (2013.01); *B65G 2201/0294* (2013.01)

(58) Field of Classification Search
CPC .............. B62D 65/026; B62D 65/18; B65G 2201/0294; B65G 17/002
See application file for complete search history.

(56) References Cited

U.S. PATENT DOCUMENTS

| 3,005,027 A | 10/1961 | Jean et al. | |
| 4,464,998 A * | 8/1984 | Wakabayashi | B62D 65/18 104/172.4 |
| 2006/0032728 A1 * | 2/2006 | Smith | B65G 47/61 198/468.6 |
| 2006/0219525 A1 * | 10/2006 | Dohi | B62D 65/18 198/685 |
| 2007/0000758 A1 * | 1/2007 | Matsubara | B65G 49/0459 198/465.4 |
| 2008/0000069 A1 * | 1/2008 | Savoy | B62D 65/02 29/430 |
| 2010/0140860 A1 * | 6/2010 | Gao | B62D 65/10 269/311 |
| 2012/0030924 A1 * | 2/2012 | Kilibarda | B62D 65/18 29/525.01 |
| 2018/0305134 A1 * | 10/2018 | Li | B65G 43/08 |
| 2019/0233037 A1 * | 8/2019 | Riegraf | F26B 25/02 |

FOREIGN PATENT DOCUMENTS

| DE | 102013015623 A1 | 7/2014 |
| FR | 2979889 A1 | 3/2013 |
| FR | 2985713 A1 | 7/2013 |
| FR | 2986770 A1 | 8/2013 |
| FR | 3005027 A1 | 10/2014 |
| WO | 2010076444 A1 | 7/2010 |

OTHER PUBLICATIONS

Search Report dated Mar. 5, 2019. (2 pages).

* cited by examiner

*Primary Examiner* — Mark A Deuble
(74) *Attorney, Agent, or Firm* — RMCK Law Group, PLC

(57) ABSTRACT

Described herein is a supporting frame for motor-vehicle bodyshells of a reconfigurable type. The supporting frame comprises a first pair of supports, a second pair of supports, and at least one third pair of supports for a motor-vehicle bodyshell, wherein the second pair and the third pair are configured for co-operating alternatively with the first pair for supporting a motor-vehicle bodyshell received on the frame.

8 Claims, 4 Drawing Sheets

SUPPORTING FRAME FOR MOTOR-VEHICLE BODYSHELLS

CROSS-REFERENCE TO RELATED APPLICATION

This application claims priority to Italian Patent Application No. 102018000006933 filed Jul. 4, 2018. The disclosure of the above application is incorporated herein by reference in its entirety.

FIELD

The present invention relates to line equipment for motor-vehicle assembly lines. More precisely, the invention has been developed with reference to supporting frames for motor-vehicle bodyshells used for moving the bodyshells along the assembly line (for example, from the painting area to the area of final assembly).

PRIOR ART

Supporting frames for handling motor-vehicle bodyshells (the so-called "skid") typically comprise two pairs of supports for a motor-vehicle bodyshell, on which the bodyshell is received and is locked thereon while it remains on the supporting frame and is being moved.

However, within the plant there is the need to manage production of a number of vehicles—with bodyshells of even markedly different dimensions—without having to multiply the amount of equipment necessary. The prior art offers different examples of reconfigurable supporting frames, but none of these can be deemed satisfactory for meeting the various needs. For instance, the solution known from WO 2010/076444 A1 is characterised in that a pair of supports is mounted at the ends of a respective articulated arm consisting of two segments in such a way that each arm can be reconfigured so as to vary the position of the pins carried thereby with respect to the supports of a second pair, which are instead fixed on the frame. The solution suffers in the first place from a poor precision of positioning of the mobile supports, as well as from the need to duplicate the action of positioning on the two sides of the frame (right and left). But the perhaps most serious problem lies in the fact that in some deformed configurations of the articulated arm, the free length thereof is critical for the structural strength of the equipment.

Object

The object of the present invention is to solve the technical problems mentioned previously. In particular, the object of the invention is to provide a supporting frame for motor-vehicle bodyshells that can be reconfigured for receiving bodyshells of different dimensions without any difference of performance between the configurations allowed.

SUMMARY

The object of the present invention is achieved by a supporting frame for motor-vehicle bodyshells having the characteristics that form the subject of the annexed claims, which constitute an integral part of the technical teaching provided herein in relation to the invention.

In particular, the object of the invention is achieved by a supporting frame for motor-vehicle bodyshells comprising:

a first pair of supports, the supports of said first pair having a first orientation with respect to said frame and being spaced apart in a transverse direction of said frame; and a second pair of supports and at least one third pair of supports configured for co-operating alternatively with said first pair of supports for receiving a motor-vehicle bodyshell, said second pair of supports and at least one third pair of supports being arranged in positions spaced apart, in a longitudinal direction of said frame, from said first pair of supports wherein:

the second pair of supports and the third pair of supports are carried by an auxiliary frame that is rotatable about a transverse axis between a first operating position and a second operating position;

in the first operating position, the auxiliary frame positions the second pair of supports according to the first orientation with respect to the frame and so that it is longitudinally spaced apart from the first pair of supports by a first longitudinal distance, while the third pair of supports is positioned with a second orientation with respect to the frame; and in the second operating position, the auxiliary frame positions the third pair of supports according to the first orientation with respect to the frame and so that it is longitudinally spaced apart from the first pair of supports by a second longitudinal distance, while the second pair of supports is positioned with a third orientation with respect to the frame.

BRIEF DESCRIPTION OF THE DRAWINGS

The present invention will now be described with reference to the annexed drawings, which are provided purely by way of non-limiting example and in which.

DETAILED DESCRIPTION

Figure 1:
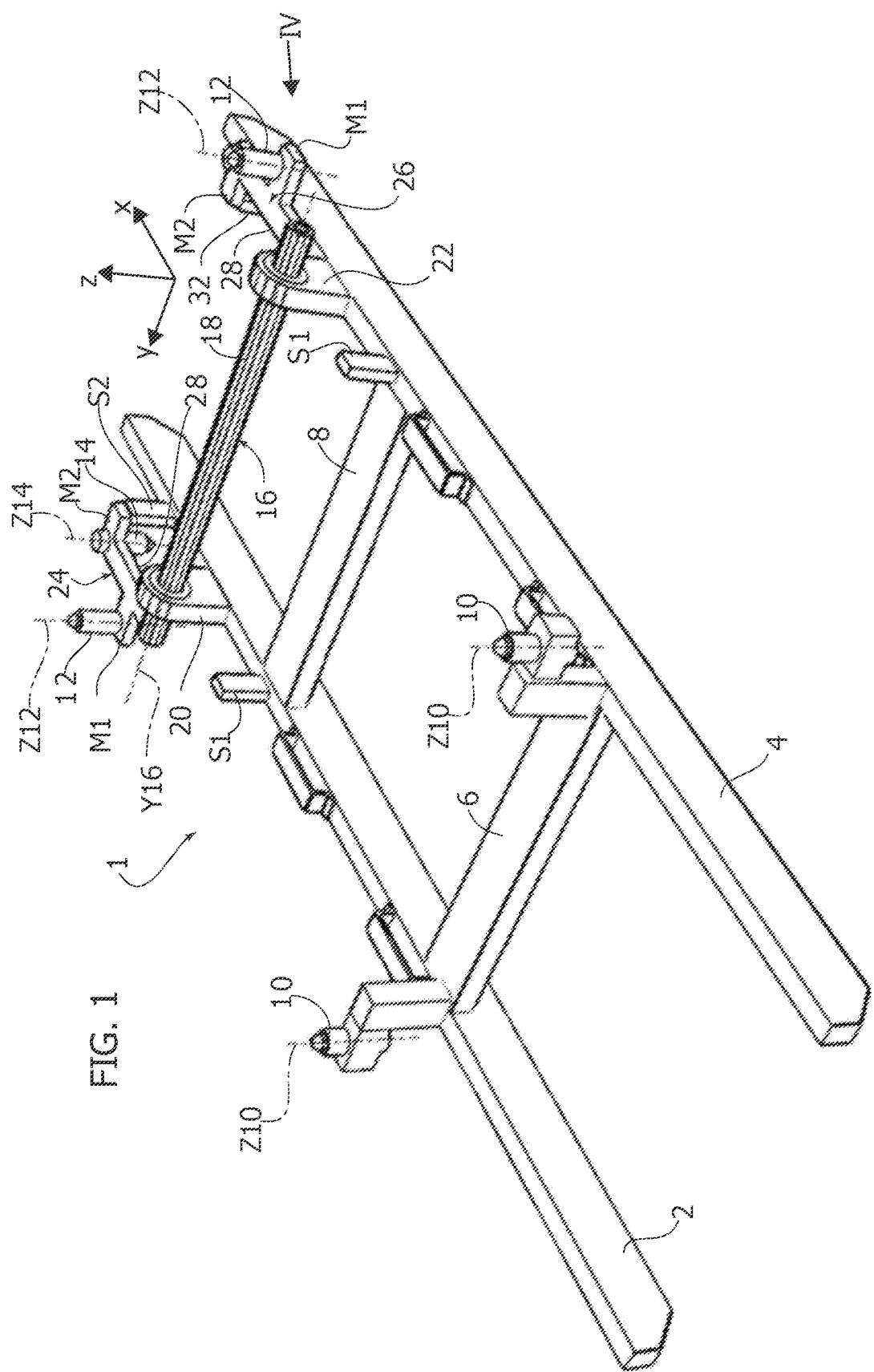
FIG. 1 is a perspective view of a supporting frame according to the invention.

The reference number 1 in FIG. 1 designates as a whole a supporting frame according to the invention. The frame 1 comprises, in an embodiment corresponding to the one illustrated in the figure, a first longitudinal member 2 and a second longitudinal member 4, which extend in a longitudinal direction X, and a first cross member 6 and a second cross member 8, which extend in a transverse direction Y to connect the longitudinal members 2, 4. As a whole, in this embodiment, the frame 1 is shaped like a double H.

The frame 1 comprises a first pair of supports 10, fixed on the frame 1. In particular, each support 10 is mounted on a respective longitudinal member 2, 4 and is fixed thereon, so that the supports 10 of the first pair are moreover spaced apart in the transverse direction Y of the frame 1.

The supports 10 of the first pair have a first orientation with respect to the frame 1, and in particular have an orientation such as to favour reception of a motor-vehicle bodyshell. With respect to the reference system illustrated in FIG. 1, the first orientation corresponds to a vertical orientation (axis Z10 parallel to a vertical axis Z) pointing upwards, towards a top surface of the frame, which is the surface configured for facing a motor-vehicle bodyshell that in use is received on the frame 1.

The frame 1 further comprises a second pair of supports 12 and at least one third pair of supports 14, where the supports of each pair are configured for co-operating alternatively with the first pair of supports 10 for receiving a motor-vehicle bodyshell.

The second pair of supports 12 and the third pair of supports 14 are arranged in positions spaced apart from the first pair of supports 10 in the longitudinal direction X of the frame 1.

Figure 2:
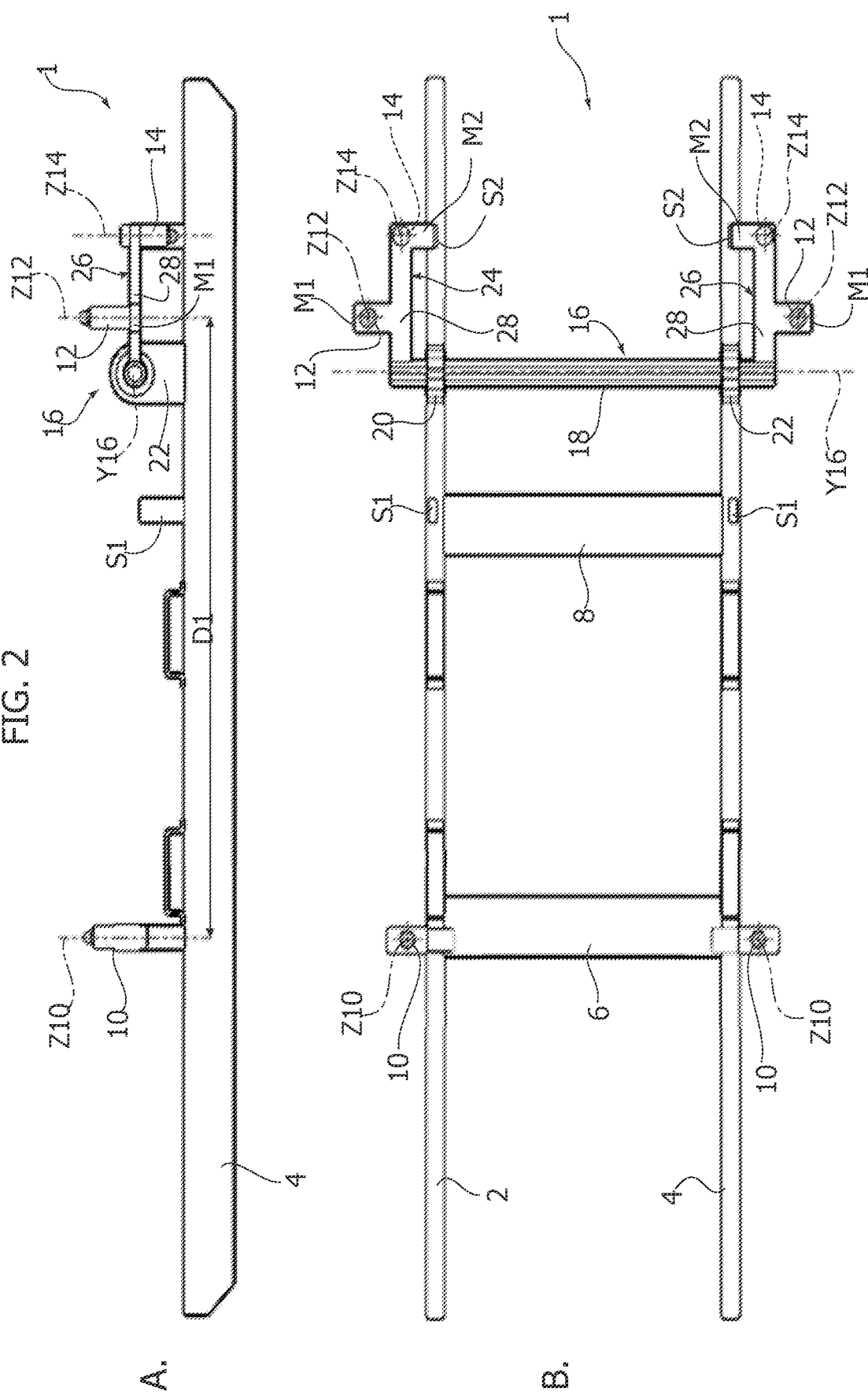
FIGS. 2A and 2B are, respectively, a view in elevation and a top plan view of the frame of FIG. 1 in a first operating position.
Figure 3:
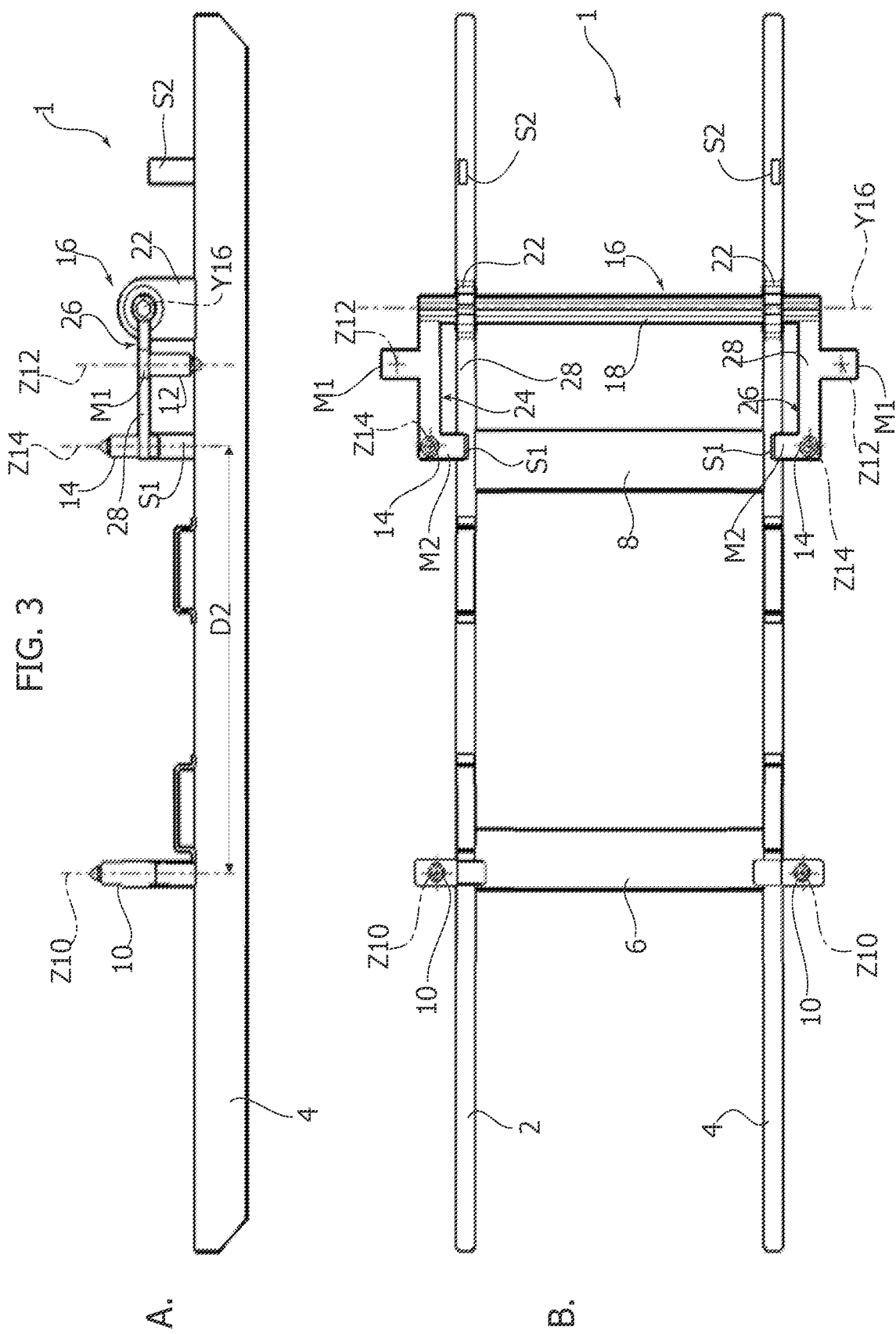
FIGS. 3A and 3B are, respectively, a view in elevation and a top plan view of the frame of FIG. 1 in a second operating position.

According to the invention, the second pair of supports 12 and the third pair of supports 14 are carried by an auxiliary frame 16, which is able to turn about a transverse axis Y16 between a first operating position (FIG. 2) and a second operating position (FIG. 3).

The auxiliary frame 16 comprises a cross member 18, which extends in a transverse direction with respect to the frame 1 (in a direction parallel to the transverse direction Y) and is supported so that it is able to turn with respect to the frame 1, in particular by means of a first support 20 and a second support 22, which are arranged, respectively, on the longitudinal member 2 and on the longitudinal member 4 and are set at the same longitudinal distance apart from the corresponding supports 10.

The cross member 18 bears, at respective opposite ends, a first plate 24 and a second plate 26, each of which carries a support 12 of the second pair and a support 14 of the third pair. On each of the plates 24, 26, the support 12 and the support 14 are arranged on opposite sides of each plate itself. In the embodiment illustrated in the figures, the supports 12, 14 are arranged orthogonal to the plane of the respective plate 24, 26.

Each of the plates 24, 26 comprises a rectilinear (striplike) main portion 28, from which there project in a transverse direction and on opposite sides a first bracket M1 and a second bracket M2. Installed on each bracket M1 is a corresponding support 12, whereas the support 14 is installed on the portion 28.

For each plate 24, 26 of the auxiliary frame 16, on each longitudinal member 2, 4, a first stop element S1 and a second stop element S2 are provided, arranged on opposite sides relative to the respective supports 20, 22.

The first stop element S1 is configured for exerting an action of contrast in regard to the plate 24, 26 (and specifically to the bracket M1) when the auxiliary frame 16 is in the second operating position (FIG. 3), whereas the second stop element S2 is configured for exerting an action of contrast in regard to the plate 24, 26 (and specifically to the bracket M2) when the auxiliary frame 16 is in the first operating position (FIG. 2).

Figure 4:
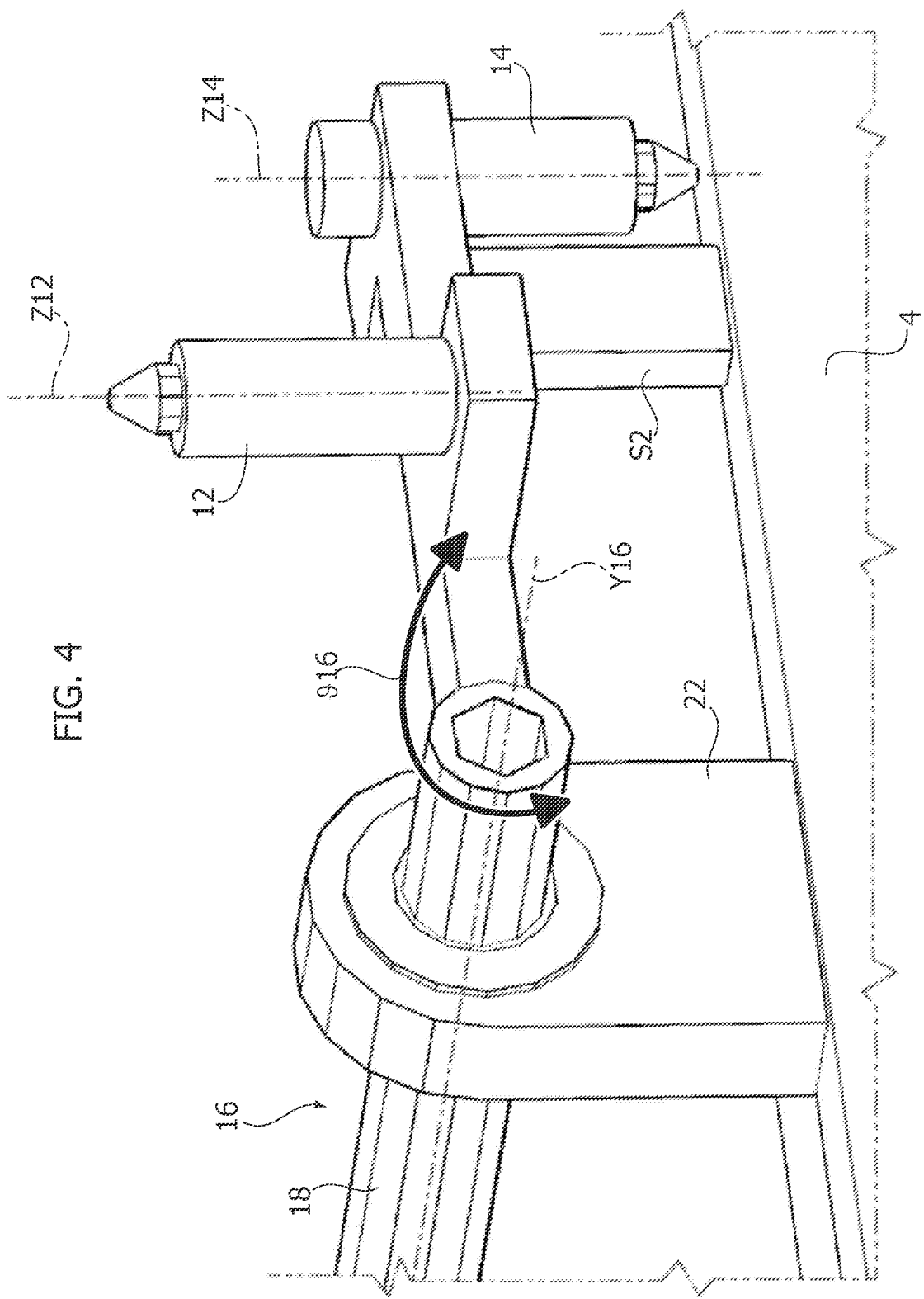
FIG. 4 is a detailed view according to the arrow IV of FIG. 1.

Passage from the first operating position to the second operating position is obtained via rotation (tilting θ16, FIG. 4) of the auxiliary frame about the axis Y16. In the first operating position visible in FIGS. 1 and 2, the auxiliary frame 16 is rotated so as to rest the plates 24, 26 on the supports S2 (via the brackets M2) in a longitudinally external position with respect to the area comprised between the supports 20, 22 and the supports 10. In this way, the second pair of supports 12 is set according to the first orientation with respect to the frame 1, and in particular the respective axes Z12 of the supports 12 are arranged parallel to the axis Z and to the axes Z10.

The supports 12 are thus arranged in a position longitudinally spaced apart from the first pair of supports 10 by a first longitudinal distance D1, while the third pair of supports 14 comes to be positioned with a second orientation with respect to the frame 1. If the first orientation is, so to speak, such as to favour reception of the bodyshell, the second orientation disables the possibility of receiving a motor-vehicle bodyshell by the second pair of supports 12. In the preferred embodiment illustrated herein, the second orientation is a vertical orientation pointing downwards, towards a bottom surface of the frame, which is the surface that faces away from a motor-vehicle bodyshell that in use is received on the frame. Hence, the axis Z14 of the supports 14 is parallel to the vertical, but the support 14 is on the blind side of the mesh of four resting points defined by the pairs of supports 10, 12.

In the second operating position, which can be reached via a counterclockwise rotation θ16 of the auxiliary frame 16 about 180°, the auxiliary frame 16 is rotated so as to rest the plates 24, 26 on the supports S1 (via the brackets M1) in a position longitudinally internal with respect to the area comprised between the supports 20, 22 and the supports 10. In this way, the third pair of supports 14 is set with the first orientation with respect to the frame 1, and in particular the respective axes Z14 of the supports 14 are set parallel to the axis Z and to the axes Z10.

The supports 14 thus come to be arranged in a position longitudinally spaced apart from the first pair of supports 10 by a second longitudinal distance D2, while the second pair of supports 12 comes to be positioned with a third orientation with respect to the frame 1. According to the positioning along the plates 24, 26, the distance D1 and the distance D2 are different from one another, and in particular the distance D2 is less than the distance D1: hence, the distance D1 (and the first operating position of the auxiliary frame 16) is the choice to be made whenever bodyshells of large dimensions are to be supported, whereas the distance D2 (and the second operating position of the frame 16) is the choice to be made whenever medium-to-small bodyshells are to be supported.

Moreover, given that the supports 14 are positioned on the portion 28, where the supports 12 are positioned more externally in a transverse direction on the brackets M1, the quadrangular mesh defined by the supports 10, 12 is wider in a transverse direction, at the supports 12, than the quadrangular mesh defined by the supports 10, 14.

The third orientation, like the second, disables the possibility of receiving a motor-vehicle bodyshell by the second pair of supports 14. In the preferred embodiment illustrated here, the third orientation coincides with the second orientation and is a vertical orientation pointing downwards, towards a bottom surface of the frame, which is the surface facing away from a motor-vehicle bodyshell that in use is received on the frame. Consequently, the axis Z12 of the supports 12 is parallel to the vertical, but the support 12 is on the blind side of the mesh of four resting points defined by the pairs of supports 10, 14

It should be noted then that the frame 1 according to the invention solves all the technical problems left open by the prior art. Reconfiguration is easy and does not require bilateral action. Driving can be obtained either manually and by incorporating a motor-reducer assembly in one (or both) of the supports 20, 22 to carry out rotation of the auxiliary frame 16. In no case is the free length of the plates 24, 26 critical for structural integrity of the frame 1, especially considering that they bear upon the supports S1, S2, to rest thereon in an optimal way. Moreover, the auxiliary frame 16 in itself is suited to possible solutions of modularity: it can, in fact, be reproduced in a symmetrical way in a position corresponding to the first pair of supports 10. In this case, the frame 1 includes two auxiliary frames 16, one as the one just described and the other incorporating the supports 10 and a fourth pair of supports. It thus becomes possible to multiply the number of bodyshell geometries that the frame 1 is able to receive.

Of course, the details of construction and the embodiments may vary widely with respect to what has been described and illustrated herein, without thereby departing from the scope of the present invention, as defined by the annexed claims.

What is claimed is:

1. A supporting frame for motor-vehicle body shells, comprising:
   a first pair of supports, the supports of said first pair having a first orientation with respect to said supporting frame and being spaced apart in a transverse direction of said supporting frame;
   a second pair of supports and at least one third pair of supports, which are configured for co-operating alternatively with said first pair of supports for receiving a motor-vehicle bodyshell, said second pair of supports and at least one third pair of supports being arranged in positions spaced apart, in a longitudinal direction of said supporting frame, from said first pair of supports,
   wherein:
   the second pair of supports and the at least one third pair of supports are carried by an auxiliary frame, which is rotatable about a transverse axis between a first operating position and a second operating position;
   in the first operating position, the auxiliary frame positions the second pair of supports according to the first orientation with respect to the supporting frame and so that the second pair of supports is longitudinally spaced apart from the first pair of supports by a first longitudinal distance, while the at least one third pair of supports is positioned with a second orientation with respect to the supporting frame;
   in the second operating position, the auxiliary frame positions the third pair of supports according to the first orientation with respect to the supporting frame and so that the third pair of supports is longitudinally spaced apart from the first pair of supports by a second longitudinal distance, while the second pair of supports is positioned with a third orientation with respect to the supporting frame;
   said auxiliary frame comprises a cross member, which extends in the transverse direction with respect to said supporting frame and is rotatably supported with respect thereto, said cross member bearing at respective opposite ends a first plate and a second plate, each of which carries a support of the second pair of supports and a support of the at least one third pair of supports arranged on opposite sides of the respective plate;
   the supporting frame further includes, for each plate of the first and second plates of the auxiliary frame, a first stop element configured for exerting an action of contrast in regard to said plate when the auxiliary frame is in the second operating position, and a second stop element configured for exerting an action of contrast in regard to said plate when the auxiliary frame is in the first operating position; and
   each plate of the first and second plates includes a rectilinear main portion and a first bracket and a second bracket, which project in the transverse direction on opposite sides of the main portion, said first bracket being configured to bear upon said first stop element, and said second bracket being configured to bear upon said second stop element.

2. The supporting frame according to claim 1, wherein said first orientation is an orientation such as to favour reception of the motor-vehicle bodyshell, whereas said second orientation and said third orientation disable a possibility of receiving the motor-vehicle bodyshell by the second pair of supports and the at least one third pair of supports, respectively.

3. The supporting frame according to claim 1, wherein said first longitudinal distance and said second longitudinal distance are different from one another.

4. The supporting frame according to claim 1, wherein said first orientation is a vertical orientation pointing upwards, towards a top surface of the supporting frame, which is a surface configured for facing the motor-vehicle bodyshell that in use is received on the supporting frame, and said second orientation is a vertical orientation pointing downwards, towards a bottom surface of the supporting frame, which is a surface that faces away from the motor-vehicle bodyshell that in use is received on the supporting frame.

5. The supporting frame according to claim 1, wherein the supports of the second pair of supports are positioned on a respective second bracket, whereas the supports of the third pair of supports are positioned on said main portion, wherein a transverse distance between the supports of the second pair of supports is greater than a transverse distance between the supports of the third pair of supports.

6. The supporting frame according to claim 1, wherein the first longitudinal distance is greater than the second longitudinal distance.

7. The supporting frame according to claim 1, wherein said second orientation and said third orientation coincide.

8. The supporting frame according to claim 5, wherein the first longitudinal distance is greater than the second longitudinal distance.

* * * * *